UNITED STATES PATENT OFFICE.

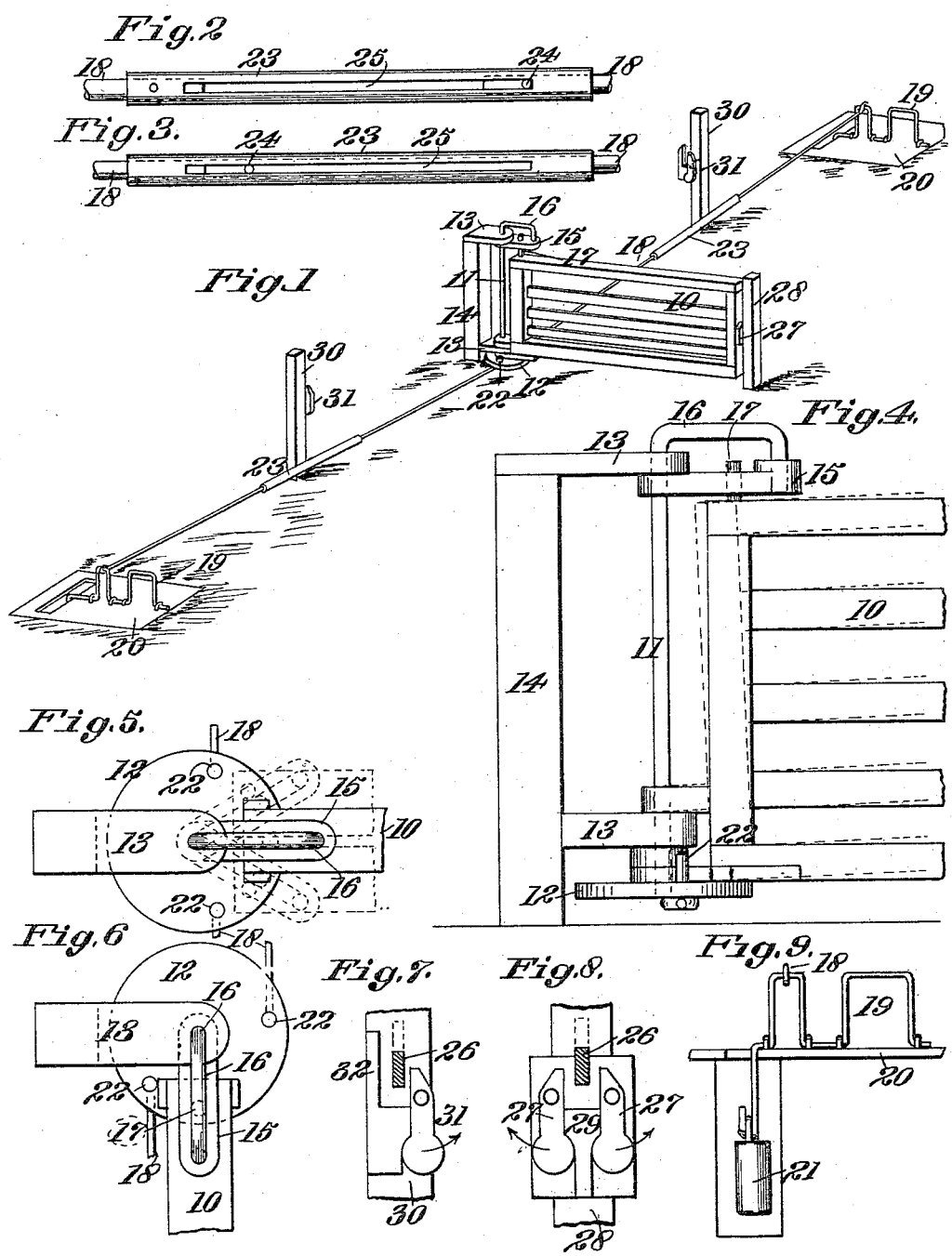

AMERICO J. RESPINI AND FRANK DE GIOVANI, OF PETALUMA, CALIFORNIA.

GATE.

1,235,381.   Specification of Letters Patent.   Patented July 31, 1917.

Application filed May 1, 1916. Serial No. 94,620.

*To all whom it may concern:*

Be it known that we, AMERICO J. RESPINI and FRANK DE GIOVANI, citizens of the United States, residing at Petaluma, in the county of Sonoma and State of California, have invented a new and useful Improvement in Gates, of which the following is a specification.

This invention relates to automatically operated gates; and has for its object to simplify and improve the construction and operation of such devices.

We accomplish this object by the provision of a swinging gate having means at either side adapted to be operated by a passing vehicle to open the gate in a direction away from the vehicle, said means being also capable of closing the gate when the vehicle passes in an opposite direction, and means for latching the gate in closed and opened positions, said latching means being also operated by the automatic closing and opening mechanism.

One form which our invention may assume is exemplified in the following description and illustrated in the accompanying drawings, in which—

Figure 1 shows a perspective view of a gate embodying our invention.

Figs. 2 and 3 show detailed views of the sliding connection employed in the transmission links, the parts being there illustrated in different positions of adjustment.

Fig. 4 shows a side elevation of the rear portion of the gate shown in Fig. 1.

Fig. 5 shows a plan view of the same.

Fig. 6 shows a view, similar to Fig. 5, with the gate in opened position.

Fig. 7 shows a detail view of the latch mechanism for retaining the gate in opened position.

Fig. 8 shows a similar view of the latch mechanism for retaining the gate in closed position.

Fig. 9 shows a detail view of the vehicle-actuated rocking mechanism for controlling the gate.

Referring now in detail to the form of our invention illustrated herewith, a gate 10 is hinged at its lower rear corner to a vertical shaft 11, which shaft has fixed upon it, at its lower end, an oscillating disk or plate 12 and is journaled in bearings 13 secured to a post 14. The upper end of the shaft 11 carries an arm 15, held rigidly thereon by means of a cranked end 16 on the shaft connected to the outer end of the arm. The upper corner of the gate is connected, by a hinge pintle 17, to the intermediate portion of the arm 15.

At points on the inner half of the plate 12, separated by less than 180°, are connected transmission links 18 extending in opposite directions at right angles to the gate, when the latter is in closed position, and connected to the crank portions of rocking bails mounted upon a base 20 in the path of the vehicles moving through the gate, said bails being each held by a weight 21 in a position where the crank portions will be vertically disposed. An upstanding lug 22 is fixed on top of the plate 12, adjacent to the connection of each of the transmission links therewith, which lugs are adapted to engage with the lower corner of the gate when the oscillating plate has been moved the required distance. The transmission links each have a slidable or telescopic connection formed of a sleeve 23 fixed to one link member and telescopically receiving the other link member, which latter has a pin 24 working in a slot 25 formed in the sleeve to limit the relative movement between the parts. In normal position, with the gate closed, the telescopic connections are held near their distended limit of movement, the rocking bails being then in vertical position.

The gate has a rigid latch bar 26, adapted to coöperate with pivoted keepers 27 on a post 28 to retain the gate in closed position, said keepers being each weighted at its lower end to occupy a vertical position and having inclined upper corners to permit the latch bar to engage therewith when being moved from either direction to closed position, whereby to rock the keeper on its pivot and permit the latch bar to move into position between the two keepers and be held therein by reason of a block 29, on the post, which prevents opposite swinging movement of the keepers.

Adjacent to the head of the gate, when the latter is in opened position at either side, is a post 30 also fitted with means to coact with the latch bar 26, said means comprising in each case a pivoted keeper 31, similar to the keepers 27, on the inner side of the post, and a fixed stop device 32 on the outer side of the post.

In the operation of the device, a vehicle passing over the rocking bail at either side in a direction toward the gate will cause the transmission links to be moved inwardly, thereby turning the vehicle shaft 11, which, through the agency of the rigid arm 15, will first tilt the gate, as shown in dotted lines in Fig. 4, a sufficient distance to clear the latch bar 26 of the keepers 27, and thereupon the lug 22, adjacent to the actuating links, will come in contact with the lower corner of the gate and swing it around in a direction away from the vehicle. During this movement the opposite rocking bail will not be operated on account of the sliding connections between the link members, the connections shifting from their distended limit of movement to their extended limit as the point of connection of the transmission links with the oscillating plate 12 passes over dead-center and to the opposite side thereof, as shown in Fig. 6.

With the gate in opened position and the vehicle having passed therethrough the operating bail will return to upright position by reason of the weight attached thereto, and will do so without disturbing the position of the gate, on account of the sliding connections before referred to. The other rocking bail will next be operated by the vehicle passing away from the gate and said bail will be moved in a direction opposite to the movement imparted to the first bail. So actuated, the second bail will exert a pull on its transmission links and swing the gate to closed position. As in the case of opening, the first movement of the vertical shaft 11, when actuated in a direction to close the gate, will impart a tilting movement to the gate to free it from the latch mechanism which retains it in opened position, and thereafter the lug 22 will strike the bottom of the gate and swing it to closed position.

By giving the crank portions of the rocking bails a comparatively long throw we can provide an independent movement of the vertical shaft 11 for raising the outer end of the gate, and with this in view we space the lugs 22 some distance to either side of the gate so that swinging movement will not be imparted until the gate is free of its latch. We find that a comparatively short movement of the lug in engagement with the gate is required to close or open the same on account of the positive thrust and the quick action which creates sufficient momentum to allow the gate to complete is swinging movement.

While we have shown and described herein but one form of our invention, it will be understood that the same in susceptible of modification and that changes in the construction and arrangement of the several parts may be employed without departing from the spirit of our invention as disclosed in the appended claims.

Having thus described our invention, what we claim and desire to secure by Letters Patent is—

1. In an automatically operated gate, the combination of a pivoted gate movable in either direction to opened position, latch mechanism for retaining said gate in opened and closed positions, an oscillating member having its pivotal connection concentric with that of the lower end of the gate, lugs on said member for engaging said gate and normally spaced therefrom to permit a limited independent movement of said member preliminary to said lugs engaging the gate, and an arm movable with said oscillating member and having an off-center connection with the upper corner of the gate whereby, upon the initial movement of said oscillating member, the gate is tilted to disengage itself from the latching mechanism.

2. In an automatically operated gate, the combination of a pivoted gate movable in either direction to opened position, latch mechanism for retaining said gate in opened and closed positions, an oscillating member having its pivotal connection concentric with that of the lower end of the gate, lugs on said member for engaging said gate and normally spaced therefrom to permit a limited independent movement preliminary to engaging the gate, an arm movable with said oscillating member and having an off-center connection with the upper corner of the gate, whereby, upon the initial movement of said oscillating member, the gate is tilted to disengage itself from the latching mechanism, transmission links connected to the oscillating member at points separated by less than 180° and on the side of the pivotal connection thereof adjacent to the gate, said links extending in opposite directions at substantially right angles to the gate, and rocking bails positioned in the path of the vehicles passing through said gate for actuating said links, whereby to open the gate in a direction away from the vehicle, when actuated by an approaching vehicle, and to close the gate so opened by the rocking member at the opposite side, when actuated by a departing vehicle.

3. In a gate operating mechanism, a vertical journaled shaft, a gate pivoted at its lower rear corner to said shaft, a disk affixed to the lower end of the shaft, an arm rigid on the upper end of the shaft, a pintle connected to the gate and engaged with said arm between the ends of the latter, the upper end of said shaft being bent horizontally and downwardly and connected to the outer end of the arm, projections on the disk for engagement with opposite sides of the gate, and means connected to the disk to effect operation of the gate from either side of the latter.

4. In a gate operating mechanism, an oscillatory member, a gate pivoted at its lower rear corner to said member, an arm on said member to which the upper rear corner of the gate is pivoted, a crank borne by said member and connected to the arm, and means to oscillate said member operable from either side of the gate.

5. In a gate operating mechanism, a swingable gate pivoted so as to be tiltable, oscillatory means for tilting the gate, means to actuate the oscillatory means, and devices operated by the oscillatory means and engageable with opposite sides of the gate to open and close the latter, said devices being normally spaced from the gate so as to allow the oscillatory means to inceptively move to tilt the gate prior to said devices engaging the gate.

In testimony whereof we have hereunto set our hands in the presence of two subscribing witnesses.

AMERICO J. RESPINI.
FRANK De GIOVANI.

Witnesses:
WALTER E. FOSTER,
HENRY A. RESPINI.

Copies of this patent may be obtained for five cents each, by addressing the "Commissioner of Patents, Washington, D. C."